United States Patent
Follett, IV et al.

(10) Patent No.: US 12,338,991 B2
(45) Date of Patent: Jun. 24, 2025

(54) OXY-PFBC TEMPERATURE MANAGEMENT THROUGH STAGED GAS INJECTION AND GAS VELOCITY MANAGEMENT

(71) Applicant: GAS TECHNOLOGY INSTITUTE, Des Plaines, IL (US)

(72) Inventors: William W. Follett, IV, Calabasas, CA (US); Douglas M. Heim, Woodland Hillis, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 433 days.

(21) Appl. No.: 17/735,252

(22) Filed: May 3, 2022

(65) Prior Publication Data
US 2022/0349571 A1  Nov. 3, 2022

Related U.S. Application Data

(60) Provisional application No. 63/183,261, filed on May 3, 2021.

(51) Int. Cl.
| | |
|---|---|
| F23C 10/16 | (2006.01) |
| F23C 9/08 | (2006.01) |
| F23L 7/00 | (2006.01) |
| F23L 15/00 | (2006.01) |
| F23N 1/02 | (2006.01) |
| F22B 15/00 | (2006.01) |

(52) U.S. Cl.
CPC .............. *F23C 10/16* (2013.01); *F23C 9/08* (2013.01); *F23L 7/00* (2013.01); *F23L 15/00* (2013.01); *F23N 1/02* (2013.01); *F22B 15/00* (2013.01)

(58) Field of Classification Search
CPC .............. F23N 1/02; F23C 9/08; F23L 7/00
See application file for complete search history.

(56) References Cited

U.S. PATENT DOCUMENTS

| | | |
|---|---|---|
| 2,729,428 A | 1/1956 | Milmore |
| 3,752,224 A | 8/1973 | Sproul |
| 3,818,846 A | 6/1974 | Reese |
| 3,871,172 A | 3/1975 | Villiers-Fisher et al. |
| 4,277,938 A | 7/1981 | Belke et al. |
| 4,321,233 A | 3/1982 | Tsuji et al. |

(Continued)

FOREIGN PATENT DOCUMENTS

| | | |
|---|---|---|
| CA | 2118367 C | 6/1995 |
| CA | 2824847 C | 3/2014 |

(Continued)

OTHER PUBLICATIONS

ISA/US, English language verison of the International Search Report, Form PCT/ISA/210, for International Application PCT/US2022/027415, May 3, 2022 (04 pages).

(Continued)

*Primary Examiner* — Ko-Wei Lin
(74) *Attorney, Agent, or Firm* — Pauley Erickson & Swanson

(57) ABSTRACT

A pressurized fluidized bed combustor (PFBC) and method of operation. A heated diluent is used alone or in combination with adjustments to a combustor gas velocity, to manage the bed temperature and keep it within allowable ranges. The diluent can be taken from the combustor flue gas, and recycled and reheated through the fluidized bed.

20 Claims, 2 Drawing Sheets

(56) References Cited

U.S. PATENT DOCUMENTS

| | | | |
|---|---|---|---|
| 4,359,326 A | | 11/1982 | Hoffert et al. |
| 4,419,965 A | | 12/1983 | Garcia-Mallol et al. |
| 4,441,435 A | | 4/1984 | Miyamoto |
| 4,453,495 A | | 6/1984 | Strohmeyer, Jr. |
| 4,944,148 A | * | 7/1990 | Hjalmarsson ............ F02C 3/205 |
| | | | 60/39.464 |
| 4,993,323 A | | 2/1991 | Tabery et al. |
| 5,003,931 A | | 4/1991 | Huschauer |
| 5,133,943 A | | 7/1992 | Abdulally |
| 5,325,797 A | | 7/1994 | Mei et al. |
| 5,426,932 A | | 6/1995 | Morihara et al. |
| 5,513,599 A | | 5/1996 | Nagato et al. |
| 6,260,346 B1 | | 7/2001 | Jansson et al. |
| 8,161,917 B2 | | 4/2012 | Yang et al. |
| 2008/0000403 A1 | | 1/2008 | Morin et al. |
| 2009/0293782 A1 | * | 12/2009 | Eriksson ............... F22B 35/002 |
| | | | 60/39.52 |
| 2011/0073051 A1 | | 3/2011 | Taniguchi et al. |

FOREIGN PATENT DOCUMENTS

| | | |
|---|---|---|
| CN | 1304783 C | 12/2004 |
| CN | 101255987 A | 9/2008 |
| CN | 101761915 A | 6/2010 |
| EP | 0444926 A2 | 9/1991 |
| EP | 1847773 A2 | 10/2007 |
| EP | 2309181 B1 | 12/2015 |
| PL | 313815 A1 | 7/1996 |
| WO | WO1995023314 A1 | 8/1995 |
| WO | WO2011/144806 A1 | 11/2011 |
| WO | WO 2017161460 A1 | 9/2017 |

OTHER PUBLICATIONS

ISA/US, Form PCT/ISA/237, Written Opinion of the International Searching Authority, for International Application PCT/US2022/027415, May 3, 2022 (08 pages).

PL, Warszawa, Poland, Poland Search Report for International Application DE.P.448306, Jun. 28, 2024 (4 pages).

* cited by examiner

OXY-PFBC TEMPERATURE MANAGEMENT THROUGH STAGED GAS INJECTION AND GAS VELOCITY MANAGEMENT

CROSS-REFERENCE TO RELATED APPLICATION

This application claims the benefit of U.S. Provisional Patent Application Ser. No. 63/183,261, filed on 3 May 2021. The Provisional patent application is hereby incorporated by reference herein in its entirety and is made a part hereof, including but not limited to those portions which specifically appear hereinafter.

BACKGROUND OF THE INVENTION

This invention relates generally to a method and apparatus for temperature control and/or modulation in a pressurized fluidized bed combustor (PFBC), such as an oxygen-fired pressurized fluidized bed combustor (Oxy-PFBC).

A primary goal of Oxy-PFBC design is to create a compact combustor to reduce capital cost and, therefore, the cost of electricity. As a result, the in-bed heat exchanger is more densely packed than previous pressurized fluidized bed combustors, such as the Grimethorpe and Leatherhead combustors.

When heat exchanger tubes are more densely packed, they tend to inhibit fluidized bed recirculation and/or the diffusion of thermal energy by the bed particles along the vertical axis of the combustor. This design will typically have higher bed temperature gradients, which can create issues in the ability of the combustor to stay within operating temperature limits.

The temperature limits within the Oxy-PFBC are bound on the lower end by minimum temperatures required to achieve good burning of the solid fuel (such as coal, petcoke, biomass, etc.) and bound on the upper end by maximum temperatures prior to onset of agglomeration due to ash melting, or damage to combustor hardware. In addition, there are upper and lower temperature bounds for optimal sulfur capture. The fluidized bed in the combustor needs to operate within these temperature ranges while also maintaining margin for robust operation.

There is a continuing need for improved PFBCs.

SUMMARY OF THE INVENTION

The invention generally relates to improving control of maximum and minimum temperature peaks in a pressurized fluidized bed combustor (PFBC), such as an oxygen-fired pressurized fluidized bed combustor (Oxy-PFBC), and enables reduction or elimination of these peaks. A diluent is used with the oxidant, and when heated provides refined temperature and mass flow management without requiring significant changes in existing equipment.

The invention includes or provides a modification to the Oxy-PFBC to improve the ability to manage the bed temperature and keep it within allowable ranges. The Oxy-PFBC of this invention is a combustor used to generate heat for power generation which utilizes solid fuel (coal, petcoke, biomass, etc.) and $O_2$ diluted with flue gas as the oxidant. The Oxy-PFBC of this invention preferably utilizes staged fuel and oxidant injection to provide fuel and oxidizer at multiple vertical locations in the combustor.

Embodiments of this invention use a non-oxidant diluent to adjust the temperature and/or gas flow within the fluidized bed. The diluent is preferably recycled flue gas (a $CO_2$ stream) from the combustor itself. The diluent can be at least partially heated by passing through the fluidized bed during the recycling process. Varying the amount of diluent passing through, vs. bypassing, the fluidized bed can be used to adjust the temperature of the recycled diluent. A valve system controls the recycled diluent flow back to the oxidant inlet/injectors, such as through and/or bypassing the fluidized bed.

The general object of the invention can be attained, at least in part, through a method of operating a pressurized fluidized bed combustor (PFBC), preferably with a multi-stage heat exchanger. The method includes adjusting a quantity and temperature of a diluent (e.g., recycled flue gas) injected with an oxidizer into the PFBC, and/or adjusting a combustor gas velocity. Adjusting the quantity and temperature of the diluent injected is accomplished with a multi-stage diluent injection. Adjusting the combustor gas velocity can be accomplished by adjusting both a fuel flow rate and a gas flow rate (of the diluent and the oxidizer) within the combustor, wherein the gas flow rate is increased proportional to the fuel flow rate. The adjusting of the diluent and the internal combustor gas velocity can be independently controlled, and used alone or together to make adjustments within the combustor system.

In embodiment of the invention, the method includes injecting a first diluent injection upstream of a first heat exchanger, and injecting a second diluent injection downstream of the first heat exchanger, such as at each oxidant/fuel injection area.

The diluent is preferably heated by the PFBC prior to the injecting. This is especially so where the flue gas must be cooled after the combustor to allow for initial collection and recycling. In embodiments of the invention, the diluent recycling line includes branch extension that pass through the fluidized bed as a heat exchanger. The diluent passing through the bed can be mixed with a diluent line bypassing the bed. Bypass valves can control and adjust the quantity of the diluent passing around and through the fluidized bed, and thus control the amount and/or the temperature of the diluent injected with the oxidizer into the PFBC.

In embodiments of this invention, the method includes increasing the combustor gas velocity to increase combustor heat output, and injecting heated diluent into at least a second stage of the multi-stage combustor to improve temperature uniformity in a first stage upstream of the second stage.

In embodiments of this invention, the adjusting of the quantity and temperature of the injected diluent includes cooling a recycled flue gas from the PFBC, injecting the recycled flue gas as the diluent at a fuel injection area of the PFBC, and preferably heating the recycled flue gas with the PFBC before the injecting.

The diluent/recycled flue gas line desirably comprises a first line through the PFBC, a second line bypassing the PFBC, and a bypass valve alternating and/or adjusting the diluent/recycled flue gas between the first line and the second line to adjust the quantity and/or the temperature of the diluent/recycled flue gas injected with the oxidizer into the PFBC.

The invention further includes a pressurized fluidized bed combustor (PFBC) including an adjustable diluent injection system. The adjustable diluent injection system desirably includes a first diluent injection port in a fuel/oxidant injection area upstream of a first heat exchanger, and a second diluent injection port at a second fuel/oxidant injection area upstream of a second heat exchanger and downstream of the first heat exchanger. Again, the diluent is desirably recycled flue gas from the PFBC.

The adjustable diluent injection system of embodiments of this invention includes a diluent line including a first line through the PFBC, a second line bypassing the PFBC, and at least one bypass valve adjusting a diluent between the first line and the second line to adjust a quantity and/or a temperature of the diluent injected with an oxidizer into the PFBC.

The PFBC can include a combustor housing containing a granular solid substrate; a first injection area including a first fuel injector for a fuel and a first oxidizer injector for an oxidant and a diluent; a first heat exchanger downstream of the first injection area; a second injection area downstream of the first heat exchanger, and including a second fuel injector for the fuel and a second oxidizer injector for the oxidant and the diluent; and a second heat exchanger downstream of the second injection area. Desirably at least one of the first injection area and the second injection area comprises a diluent line with a first line through the PFBC, a second line bypassing the PFBC, and at least one bypass valve connected between the first and second lines and configured to adjust the diluent between the first line and the second line to adjust a quantity and/or the temperature of the diluent at the first and/or second oxidizer injector.

In embodiments of this invention, each of the first injection area and the second injection area includes a section of the diluent line, and the diluent line passes through each of the first and second injection areas before being divided between the first and second oxidizer injectors.

The heat exchangers desirably and typically include a plurality of water and/or steam lines extending across the combustor housing and through a fluidized bed of the granular solid substrate.

As used herein, "upstream" and "downstream" relate to the flow direction of materials, heat, and combustion products through the PFBC, typically in a vertical direction (opposite the pull of gravity).

Other objects and advantages will be apparent to those skilled in the art from the following detailed description taken in conjunction with the appended claims and drawings.

DESCRIPTION OF THE INVENTION

The invention generally relates to improving control of maximum and minimum temperature peaks in a pressurized fluidized bed combustor (PFBC), such as an oxygen-fired pressurized fluidized bed combustor (Oxy-PFBC), and enables reduction or elimination of these peaks. A diluent, such as recycled flue gas, is used to refined temperature and mass flow management, which is not expected to require significant changes in existing equipment.

Fluidized bed reactors are typically characterized by very uniform temperature distributions throughout the bed. However, the Oxy-PFBC concept attempts to make the bed as compact as possible to reduce capital costs. As a result, the in-bed heat exchanger is significantly more dense in terms of heat exchanger tubes per unit area within the combustor. This inhibits fluid bed recirculation which results in larger temperature gradients within the bed. The apparatus and method of this invention addresses these temperature gradients, providing advanced methods to keep temperatures within appropriate operating ranges.

Embodiments of this invention provide a method which utilizes multi-stage regeneratively heated diluent injection, preferably along with gas flow velocity adjustments, to manage the uniformity of the bed temperature for more robust operability within the allowable bed temperature ranges.

Embodiments of the current invention use the following parameters to control bed temperature: 1) quantity and temperature of diluent injected, such as with the oxidizer, and/or 2) the overall combustor gas velocity (which is different than a $CO_2$ diluent) characterized as U/Umf (gas velocity divided by the minimum fluidization velocity of the fluidized bed) for each stage. The combustor gas velocity affects the efficacy of thermal diffusion within the bed by affecting the ability of bed material to recirculate within the bed, with higher relative velocities in a bubbling bed typically reducing bed material recirculation and thermal diffusion. These two approaches can be used independently or in combination.

Figure 1:
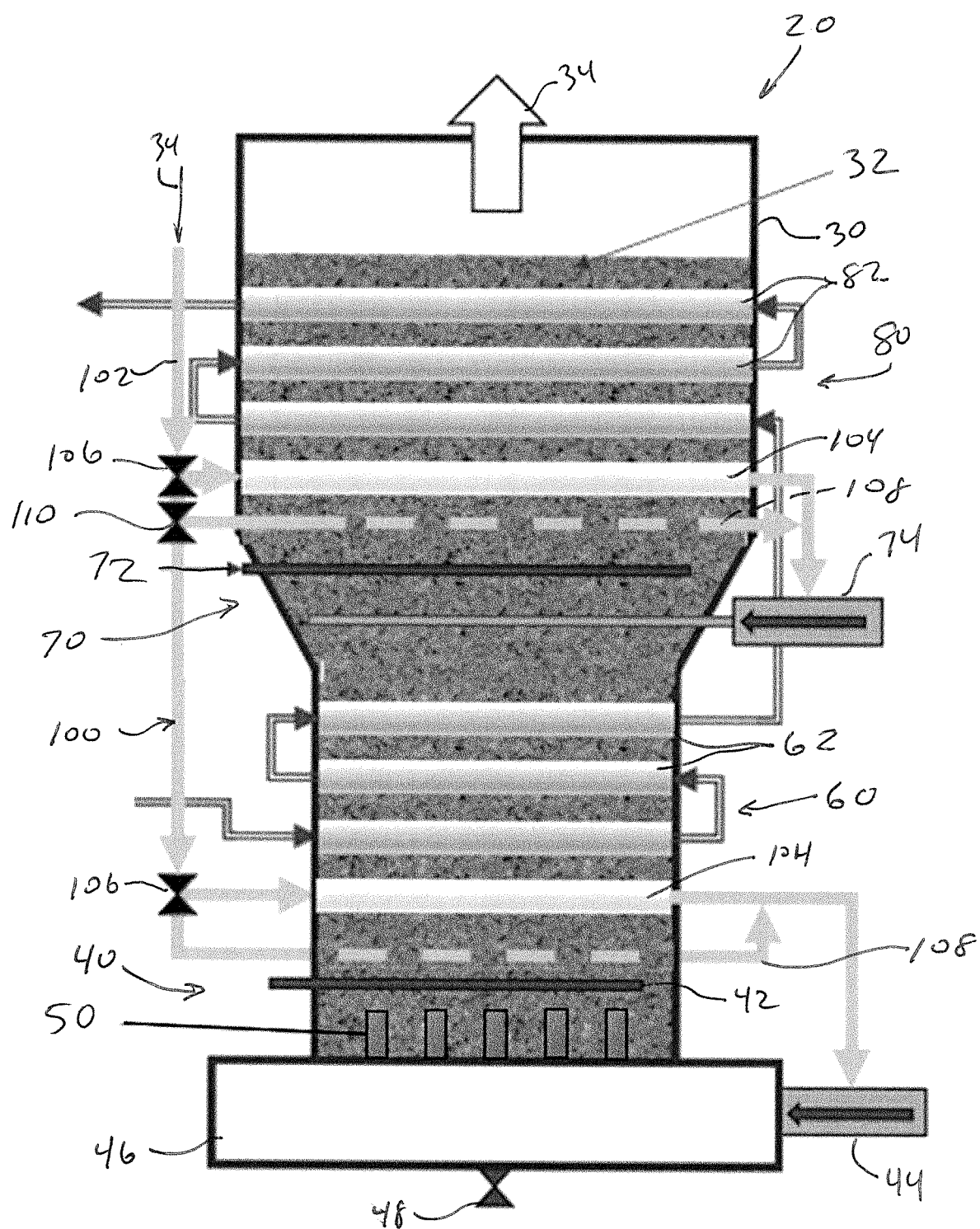
FIG. 1 schematically shows a pressurized fluidized bed combustor according to one embodiment of this invention.

FIG. 1 shows an Oxy-PFBC 20 with an adjustable diluent injection system according to one embodiment of this invention. The Oxy-PFBC 20 includes a combustor housing 30 containing a fluidized bed 32 of any known granular solid substrate. The Oxy-PFBC 20 includes a first injection area 40, shown at the bottom end of the fluidized bed 32. The first injection area 40 includes a fuel inlet 42 (e.g., coal or biomass), with pressurized injectors, and an oxidant inlet 44 (e.g., $O_2$). The oxidant inlet 44 feeds into a plenum or wind box 46, which includes a bed drain 48 and a plurality of oxidizer injectors 50 in combination with the fluidized bed 32.

Downstream of the first injection area 40 is a first water and/or steam heat exchanger 60. The heat exchanger 60 desirably includes a plurality of water and/or steam lines 62 extending through the fluidized bed 32.

The Oxy-PFBC 20 includes a second injection area 70 downstream of the heat exchanger 60. The second injection area 70 provides further fuel (e.g., coal or biomass) through fuel inlet 72 and oxidant (e.g., $O_2$) through oxidant inlet 74.

In embodiments of this invention, a multi-stage heat exchanger system is provided, including a second heat exchanger 80 downstream of the second injection system. As illustrated the second heat exchanger 80 has an additional array of lines 82, and is a continuation of water and/or steam lines from the first heat exchanger 60. In embodiments of this invention, entrance temperature into each heat exchanger is low for maximum possible cooling capacity, if needed.

In embodiments of this invention, the temperature of the bed and the flow of materials (e.g., gas and combustion products) through the combustor are controlled, at least in part, by a diluent injection system. By controlling the temperature and/or amount of the diluent injection, the overall combustor performance can be adjusted, and independently adjusted at various locations throughout the bed. The diluent can be any suitable material, desirably including a relatively high CO2 content (and not otherwise an oxidant), such as provided by the flue gas 34 of the combustor 20 itself.

FIG. 1 includes an adjustable diluent injection system 100 for recycling flue gas 34 as a diluent. The system 100 includes a main flue gas conduit 102 for delivering the diluent to one or both of the oxidant inlets 44 and 74. As illustrated, each of the first and second injection areas 40 and 70 include parallel diluent line branches 104, via bypass valves 106, through the fluidized bed 32 (as a heat exchanger) for heating the diluent supply (or a portion thereof). Each branch lines 104 are paired with a second bypass line 108 that does not go through the bed 32, but instead around the bed 32 and/or combustor housing 30. Each bypass line 108 can include a valve 110, as needed. Such parallel flow of the flue gas 34 as shown in FIG. 1 is expandable to any number of steam heat exchanger and flue gas injector stages, or other positions within the fluidized bed.

Having valved branches both through and about the fluidized bed allows for more flexible temperature control of the recycled flue gas. Such control desirably being independent at each injection stage. The amount and the temperature of diluent introduced at each injection site 44 and 74 is controllable, such as by a computerized control system, to maintain and/or adjust the internal combustor temperature and/or gas flow rate.

Figure 2:
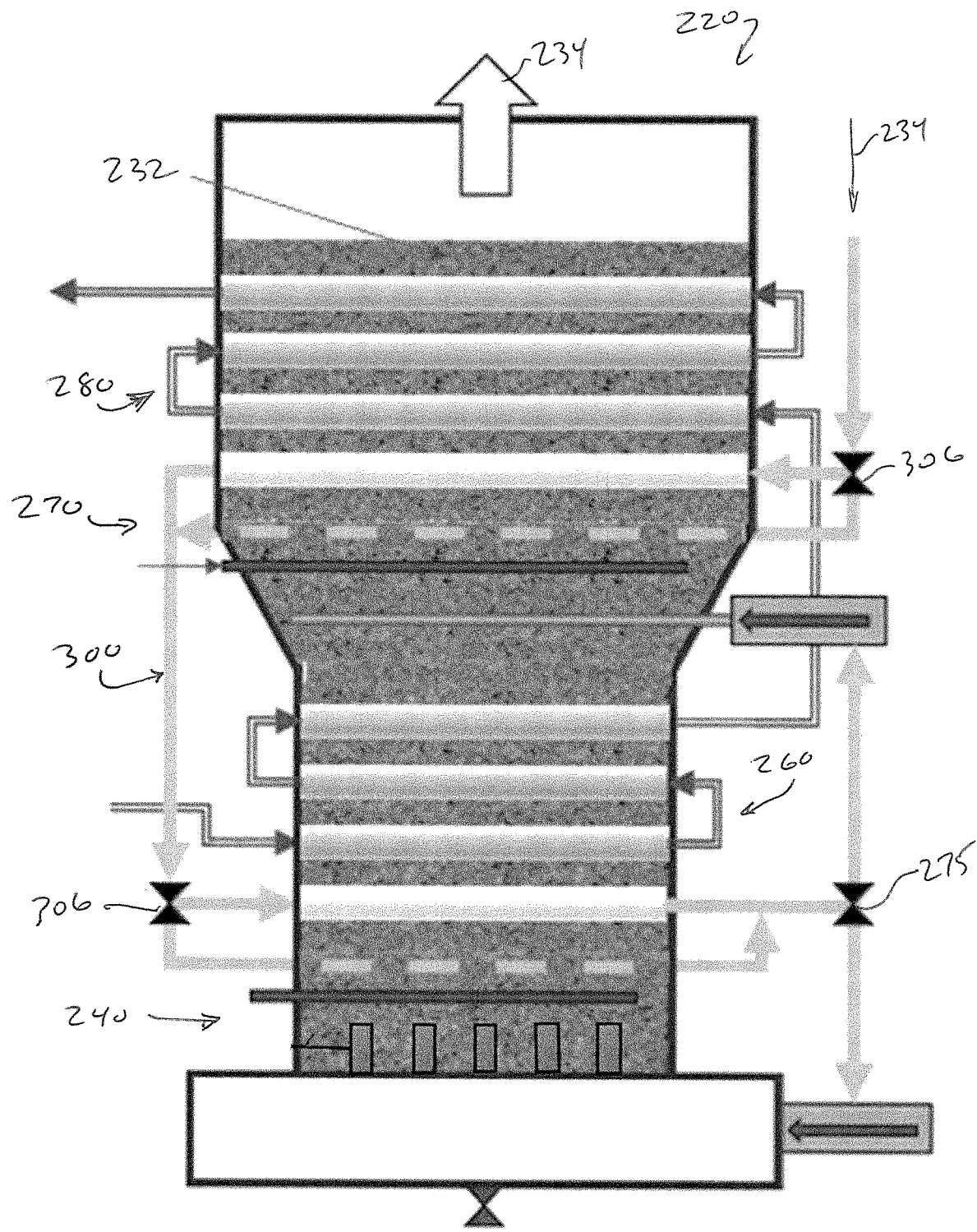
FIG. 2 schematically shows a pressurized fluidized bed combustor according to one embodiment of this invention.

In embodiments of this invention, such as shown in FIG. 2, the flue gas can pass through the fluidized bed near each water/steam heat exchanger before being divided between the two injection areas. As will be appreciated, the number of multi-stage diluent injection ports can vary depending on need, such as depending at least in part on the number of heat exchanger stages.

FIG. 2 shows an alternative embodiment of an Oxy-PFBC 220 with two injection areas 240, 270, and two corresponding heat exchangers 260, 280. FIG. 2 shows an adjustable diluent injection system 300 with a sequential flow, wherein the flue gas 234 first flows through and/or about the fluidized bed 232 upstream of the water/steam heat exchanger 280, at about the injection area 270, and then again through and/or about the bed 232 upstream of the heat exchanger 260, each diluent branch split using one valve 306 to adjust the separation volumes. The flue gas 234 then is divided between the two injection areas 240 and 270 by a splitter valve 275, or equivalent. In embodiments of this invention, such as shown in FIG. 2, the flue gas can pass through the fluidized bed 232 near each water/steam heat exchanger 260, 280, before being divided between the two injection areas 240, 270. As will be appreciated, the number of multi-stage diluent injection ports can vary depending on need, such as depending at least in part on the number of heat exchanger stages.

For the Oxy-PFBC, the diluent is desirably recycled flue gas from the combustor that is composed primarily of CO2 and steam. In embodiments, the recycle gas typically must initially be cooled due to temperature limitations of the recycle blower. The diluent can potentially be used at this reduced temperature, however, test experience and analysis indicate that this cooler temperature can inhibit ignition and combustion of the solid fuel. Thus, in the above and other embodiments of this invention, the recycle gas is regeneratively heated with heat extracted from the combustor. The heating can be done with one or multiple heat exchangers, such as with one heat exchanger for each injection stage.

Various ways to heat and/or control the amount of diluent are available, depending on need. While using the fluidized bed as a heater has efficiency advantages, an additional heater can be used external of the combustor, especially for retrofitting existing combustors with a heated diluent flow.

The recycle gas flow to the heat exchanger and injector for each stage can desirably be controlled independently of the other stage(s), thus supporting single or multi-stage combustor operation, while also allowing the recycle gas temperature for each stage to be tailored for optimal operation. Temperature control at each stage can be provided by valving that enables a portion of the recycle gas to flow through each heat exchanger while the remainder of the cooled gas is bypassed and mixed with the heated gas prior to injection.

The U/Umf velocity is controlled primarily by adjusting the fuel and gas flow rate together. Secondary control can be achieved by varying the gas flow independently. As fuel flow rate increases, the oxidizer and diluent flow are increased proportionally to maintain an appropriate fuel/oxidizer ratio. As more fuel and gas flow are introduced to the combustor, the U/Umf velocity will increase, which will drive higher temperature gradients. The temperature will tend to be higher in the lower portion of combustor stage where most of the combustion is happening, with lower temperatures near the top of the stage.

Synergistic control can be achieved by using both temperature control mechanisms together. The combustor can be throttled up with higher fuel and gas flow to increase heat output. This will lead to lower temperatures at the top of each stage. Combustor simulations have predicted that injecting heated recycle gas into the second stage can significantly improve temperature uniformity in the first stage. This occurs as the heat in the second stage works its way back down into the top of the first stage of the fluidized bed. This could allow better operability at higher power output levels.

Thus the invention provides an improved combustor design, using temperature management and/or multi-stage diluent injection. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of operating a pressurized fluidized bed combustor (PFBC) with a multi-stage heat exchanger, the method comprising:
   adjusting a quantity and temperature of diluent injected with an oxidizer into the PFBC, wherein the adjusting the quantity and temperature of the diluent injected comprises a multi-stage diluent injection;
   injecting a first diluent injection upstream of a first heat exchanger; and
   injecting a second diluent injection downstream of the first heat exchanger.

2. The method of claim 1, wherein the diluent comprises a recycled flue gas from the PFBC.

3. The method of claim 1, wherein the second diluent injection is heated by the PFBC prior to the injecting.

4. The method of claim 1, wherein a diluent line comprises a first line through the PFBC, a second line bypassing the PFBC, and at least one bypass valve adjusting the diluent between the first line and the second line to adjust the quantity and/or the temperature of the diluent injected with the oxidizer into the PFBC.

5. The method of claim 1, wherein the adjusting the quantity and temperature of the injected diluent comprises:
   cooling a recycled flue gas from the PFBC; and injecting the recycled flue gas as the diluent at a fuel injection area of the PFBC.

6. The method of claim 5, further comprising heating the recycled flue gas with the PFBC before the injecting.

7. The method of claim 5, wherein a recycled flue gas line comprises a first line through the PFBC, a second line bypassing the PFBC, and a bypass valve alternating and/or adjusting the recycled flue gas between the first line and the second line to adjust the quantity and/or the temperature of the recycled flue gas diluent injected with the oxidizer into the PFBC.

8. The method of claim 1, further comprising adjusting a combustor gas velocity.

9. A method of operating a pressurized fluidized bed combustor (PFBC) with a multi-stage heat exchanger, the method comprising adjusting a combustor gas velocity, wherein the adjusting the combustor gas velocity comprises adjusting both a fuel flow rate and a gas flow rate of a diluent and an oxidizer, wherein the gas flow rate is increased proportional to the fuel flow rate.

10. The method of claim 9, further comprising:
increasing the combustor gas velocity to increase heat output; and
injecting heated diluent into at least a second stage of the multi-stage combustor to improve temperature uniformity in a first stage upstream of the second stage.

11. The method of claim 9, further comprising adjusting a quantity and temperature of the diluent injected with the oxidizer into the PFBC.

12. The method of claim 9, wherein the diluent comprises a recycled flue gas from the PFBC.

13. A pressurized fluidized bed combustor PFBC) comprising an adjustable diluent injection system, wherein the adjustable diluent injection system comprises a first diluent injection port upstream of a first heat exchanger, and a second diluent injection port upstream of a second heat exchanger and downstream of the first heat exchanger.

14. The PFBC of claim 13, wherein the adjustable diluent injection system comprises a diluent line including a first line through the PFBC, a second line bypassing the PFBC, and at least one bypass valve adjusting a diluent between the first line and the second line to adjust a quantity and/or a temperature of the diluent injected with an oxidizer into the PFBC.

15. The PFBC of claim 14, wherein the diluent comprises recycled flue gas from the PFBC.

16. A pressurized fluidized bed combustor (PFBC) comprising:
an adjustable diluent injection system;
a combustor housing containing a granular solid substrate;
a first injection area including a first fuel injector for a fuel and a first oxidizer injector for an oxidant and a diluent;
a first heat exchanger downstream of the first injection area;
a second injection area downstream of the first heat exchanger, and including a second fuel injector for the fuel and a second oxidizer injector for the oxidant and the diluent; and
a second heat exchanger downstream of the second injection area.

17. The PFBC of claim 16, wherein at least one of the first injection area and the second injection area comprises a diluent line with a first line through the PFBC, a second line bypassing the PFBC, and at least one bypass valve connected between the first and second lines and configured to adjust the diluent between the first line and the second line to adjust a quantity and/or the temperature of the diluent at the first and/or second oxidizer injector.

18. The PFBC of claim 17, wherein each of the first injection area and the second injection area comprises the diluent line, and the diluent line passes through each of the first and second injection areas before being divided between the first and second oxidizer injectors.

19. The PFBC of claim 16, wherein the diluent comprises recycled flue gas from the PFBC.

20. The PFBC of claim 16, wherein the first and second heat exchangers each comprise a plurality of water and/or steam lines extending across the combustor housing and through a fluidized bed of the granular solid substrate.

\* \* \* \* \*